(12) United States Patent
Sahoo et al.

(10) Patent No.: US 11,624,883 B2
(45) Date of Patent: Apr. 11, 2023

(54) GAS LEAK PROOF CORRUGATED SHEATH DESIGN FOR REDUCING FRICTION IN OPTICAL FIBER CABLES

(71) Applicant: Sterlite Technologies Limited, Gurgaon (IN)

(72) Inventors: Kishore Sahoo, Gurugram (IN); Vikash Shukla, Gurugram (IN)

(73) Assignee: Sterlite Technologies Limited, Haryana (IN)

( * ) Notice: Subject to any disclaimer, the term of this patent is extended or adjusted under 35 U.S.C. 154(b) by 82 days.

(21) Appl. No.: 17/214,861

(22) Filed: Jun. 7, 2021

(65) Prior Publication Data

US 2022/0128783 A1 Apr. 28, 2022

(30) Foreign Application Priority Data

Oct. 27, 2020 (IN) .............................. 202011046806

(51) Int. Cl.
*G02B 6/44* (2006.01)
(52) U.S. Cl.
CPC ......... *G02B 6/4435* (2013.01); *G02B 6/4434* (2013.01); *G02B 6/4498* (2013.01)
(58) Field of Classification Search
CPC .. G02B 6/4435; G02B 6/4434; G02B 6/4498; G02B 6/4464; G02B 6/52
See application file for complete search history.

(56) References Cited

U.S. PATENT DOCUMENTS

| 2004/0240810 | A1* | 12/2004 | Moon | G02B 6/4435 |
| | | | | 385/113 |
| 2021/0382255 | A1* | 12/2021 | Namazue | G02B 6/4495 |
| 2022/0003949 | A1* | 1/2022 | Sato | G02B 6/4432 |

FOREIGN PATENT DOCUMENTS

| CN | 201698065 U | * | 1/2011 | ........... G02B 6/4464 |
| CN | 202649561 U | * | 1/2013 | |
| CN | 202649562 U | * | 1/2013 | |
| CN | 110361822 A | * | 10/2019 | |
| EP | 3796060 A1 | * | 3/2021 | ........... G02B 6/4403 |

OTHER PUBLICATIONS

Dura-line website, "Standard Ribbed In/Out", Oct. 2022, found at https://www.duraline.com/all-products/ribbed-inout-154/, 2 pages (Year: 2022).*

* cited by examiner

*Primary Examiner* — Daniel Petkovsek
(74) *Attorney, Agent, or Firm* — Steven R. Fairchild; Michael J. Pennington

(57) ABSTRACT

A gas leak proof corrugated sheath design for reducing friction in an optical fiber cable (100) includes a plurality of ribbons (102) in a plurality of ribbon bundles (104), one or more water swellable yarns (110), a first layer (106), one or more ripcords (108), one or more strength members (112) and a second layer (114). The first layer, surrounding the plurality of ribbon bundles by the second layer having a plurality of ribs (116) and a plurality of grooves (118) to reduce number of contact points between the optical fiber cable and a duct to reduce coefficient of friction between the second layer and an inner surface of the duct.

19 Claims, 4 Drawing Sheets

GAS LEAK PROOF CORRUGATED SHEATH DESIGN FOR REDUCING FRICTION IN OPTICAL FIBER CABLES

CROSS-REFERENCE TO RELATED APPLICATIONS

This application claims the benefit of Indian Application No. 202011046806 titled "GAS LEAK PROOF CORRUGATED SHEATH DESIGN FOR REDUCING FRICTION IN OPTICAL FIBER CABLES" filed by the applicant on Oct. 27, 2020, which is incorporated herein by reference in its entirety.

FIELD OF THE DISCLOSURE

Embodiments of the present disclosure relate to the field optical communication technology. And more particularly, relates to a gas leak proof corrugated sheath design for reducing friction in optical fiber cables.

DESCRIPTION OF THE RELATED ART

Optical fiber cables play a vital role in today's networking infrastructure and long-haul communication. The optical fiber cables are designed to have a maximum number of optical fibers to meet the demands of end-users, related to data, video, audio, or the like transmissions. Further, the optical fiber cables are designed to make them easy to install and maintain, easy to access, and easy to tear and cut whenever required. Generally, the optical fiber cables are installed by laying and blowing or are aerially deployed. During the blowing process, an optical fiber cable is installed in a pre-installed duct. Blowing of the optical fiber cable is dependent on weight, friction, stiffness and drag force on the optical fiber cable. It is known that friction plays an important role during blowing. The optical fiber cable with lower weight and higher stiffness as well as with lower coefficient of friction of a sheath blows to longer distances.

Once blowing is done, another step in installation is to seal the optical fiber cable in a joint closure box. The joint closure box is used as a branch out splicing point in optical fiber access networks. A typical application of the joint closure box is to splice optical fibers from a distribution cable towards drop fiber connections to end users. The joint closure box is generally kept under-ground and is at risk of getting flooded with water or other debris.

In order to prevent unwanted elements from entering, the joint closure box is filled with pressurised air. It becomes important that there should not be any leak point in the joint closure box. One such potential leak point is the sealing between a joint closure seal and the sheath (jacket) of the optical fiber cable. Thus, the optical fiber cables are required to seal perfectly.

Typically, the joint closure seal has a round inner cross-section. Thus, one can visualise that a smooth round optical fiber cable will seal well in the joint closure box. However, deviation begins when one starts to provide ribs on the sheath of the optical fiber cable, thus making the sheath irregular. While these irregularities help in blowing, they cause problems in sealing.

Thus, the present disclosure seeks to ameliorate one or more of the aforementioned disadvantages by providing a gas leak proof corrugated sheath design for reducing friction in the optical fiber cables.

SUMMARY OF THE DISCLOSURE

An embodiment of the present disclosure relates to a corrugated sheath for reducing friction in an optical fiber cable. The corrugated sheath comprising a plurality of ribs on an external surface of the corrugated sheath.

In accordance with an embodiment of the present disclosure, the optical fiber cable includes a plurality of ribbons, a plurality of ribbon bundles, one or more water swellable yarns, a first layer, one or more ripcords, one or more strength members and a second layer. The plurality of ribbons includes a plurality of fibers. In particular, the plurality of fibers are intermittently bonded thus forms one or more intermittently bonded ribbons. Moreover, the plurality of ribbons are bundled to form the plurality of ribbon bundles.

In accordance with an embodiment of the present disclosure, the first layer surrounds the plurality of ribbon bundles having the plurality of ribbons, which is further enclosed by the second layer, which is a corrugated sheath, having a plurality of ribs and a plurality of grooves to reduce number of contact points between the optical fiber cable and a duct. The plurality of ribs and the plurality of grooves reduce a coefficient of friction between the second layer and an inner surface of the duct, thus make the optical fiber cable suitable for efficient blowing while complying with a gas leak proof requirement.

In accordance with an embodiment of the present disclosure, the second layer which is a sheath, has a corrugated surface and is optimised to meet requirements of blowing as well as gas leak proof sealing in a joint closure box. Further, the second layer has one or more strength members embedded into it to provide tensile strength and anti-buckling properties to the optical fiber cable. Furthermore, one or more ripcords is provided for easy stripping of the optical fiber cable and the water swellable yarn is provided to prevent water ingression in the optical fiber cable.

In accordance with an embodiment of the present disclosure, the plurality of ribs is defined by corrugation ratio up to 11%.

In accordance with an embodiment of the present disclosure, the corrugation ratio is defined as $$\frac{N_g * W * H * 100}{\pi(OD^2 - ID^2) * 0.25}$$

where, $N_g$=number of grooves, W=width of groove, H=depth of groove, OD=outer diameter of the corrugated sheath (i.e., OD is measured from top of a rib to top of diametrically opposite rib) and ID=Inner diameter of the corrugated sheath.

In accordance with an embodiment of the present disclosure, the corrugated sheath ensures no gas leak from a joint closure box filled with air or any other suitable gas with a gauge pressure of 0.3±0.03 bar.

In accordance with an embodiment of the present disclosure, the temperature inside a gas sealing system is in a range of 15° to 25° C.

In accordance with an embodiment of the present disclosure, the tracer gas used for testing is 5% Hydrogen and 95% Nitrogen or any other suitable tracer gas. Particularly, the tracer gas is used for gas leakage testing. Moreover, the testing of tracer gas involves one or more gas sensors.

In accordance with an embodiment of the present disclosure, the plurality of ribs has a height up to 0.3 mm.

In accordance with an embodiment of the present disclosure, the distance between successive ribs of the plurality of ribs is 0.2 to 2.5 mm.

In accordance with an embodiment of the present disclosure, the number of ribs per unit outer diameter of optical fiber cable is 1.2 to 6.2.

In accordance with an alternate embodiment of the present disclosure, the corrugated sheath has one or more strength members embedded into the corrugated sheath.

In accordance with an alternate embodiment of the present disclosure, the corrugated sheath is used in the optical fiber cable. Particularly, the optical fiber cable has a central strength member.

In accordance with an alternate embodiment of the present disclosure, all ribs of the plurality of ribs are of same height and all grooves of a plurality of grooves are of same depth.

In accordance with an alternate embodiment of the present disclosure, an inner surface of the corrugated sheath is smooth or non-corrugated.

An aspect of present disclosure relates to reducing a number of contact points between the optical fiber cable and a duct to further reduce a coefficient of friction between a sheath of the optical fiber cable and an inner surface of the duct.

These and other aspects herein will be better appreciated and understood when considered in conjunction with the following description and the accompanying drawings. It should be understood, however, that the following descriptions are given by way of illustration and not of limitation. Many changes and modifications may be made within the scope of the disclosure herein without departing from the spirit thereof.

The foregoing objectives of the present disclosure are attained by employing a corrugated sheath in an optical fiber cable for reducing friction in the optical fiber cable.

BRIEF DESCRIPTION OF THE DRAWINGS

So that the manner in which the above recited features of the present disclosure is understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

ELEMENT LIST

Figure 1:
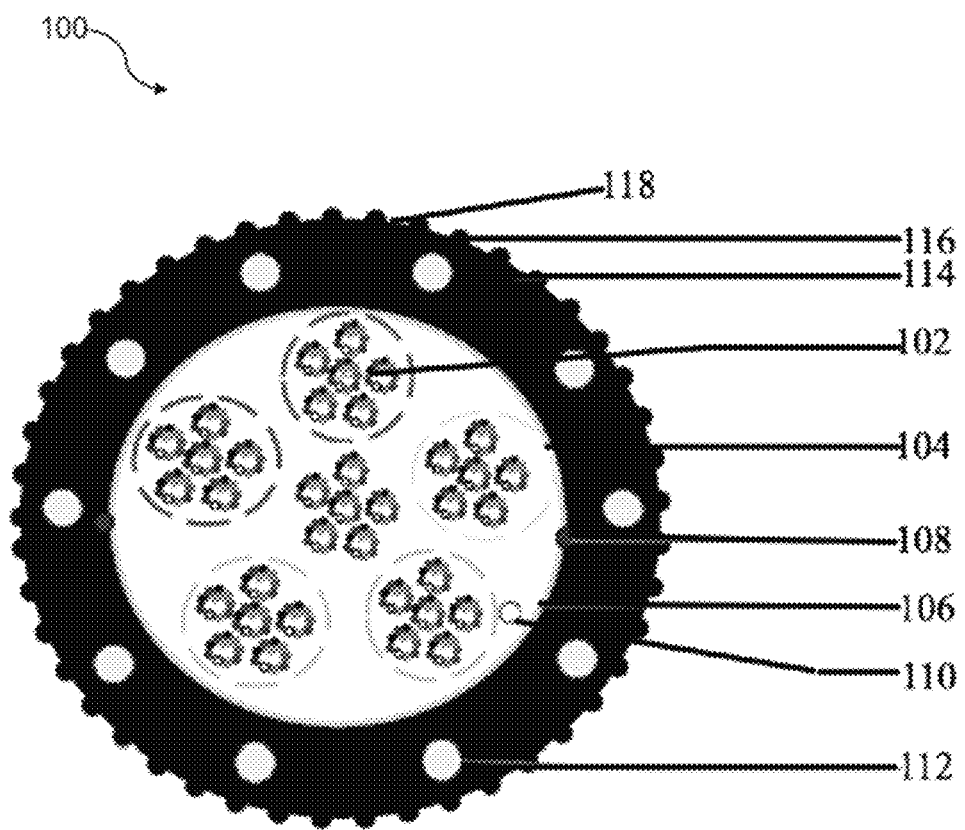
FIG. 1 is a pictorial representation illustrating a corrugated sheath design for an optical fiber cable in accordance with an embodiment of the present disclosure.

Optical Fiber Cable 100
Plurality Of Ribbons 102
Plurality Of Ribbon Bundles 104
First Layer 106
One Or More Ripcords 108
One Or More Water Swellable Yarns 110
One Or More Strength Members 112
Second Layer 114
Corrugated Sheath 114
Plurality Of Ribs 116
Plurality Of Grooves 118
Seal 120
Outer Diameter Of The Sheath 122
Inner Diameter Of The Sheath 124
Second Layer 114 and Corrugated Sheath 114 are used interchangeably for convenience.

The method and system are illustrated in the accompanying drawings, throughout which like reference letters indicate corresponding parts in the various figures.

It should be noted that the accompanying figure is intended to present illustrations of exemplary embodiments of the present disclosure. This figure is not intended to limit the scope of the present disclosure. It should also be noted that the accompanying figure is not necessarily drawn to scale.

DETAILED DESCRIPTION OF THE DISCLOSURE

The present disclosure relates to a gas leak proof corrugated sheath design for reducing friction in an optical fiber cable.

The principles of the present disclosure and their advantages are best understood by referring to FIG. 1 to FIG. 4. In the following detailed description numerous specific details are set forth in order to provide a thorough understanding of the embodiment of disclosure as illustrative or exemplary embodiments of the disclosure, specific embodiments in which the disclosure may be practiced are described in sufficient detail to enable those skilled in the art to practice the disclosed embodiments. However, it will be obvious to a person skilled in the art that the embodiments of the disclosure may be practiced with or without these specific details. In other instances, well known methods, procedures and components have not been described in details so as not to unnecessarily obscure aspects of the embodiments of the disclosure.

The following detailed description is, therefore, not to be taken in a limiting sense, and the scope of the present disclosure is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present disclosure.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The following brief definition of terms shall apply throughout the present disclosure:

Generally, an optical fiber refers to a medium associated with signal transmission over long distances in the form of light pulses. The optical fiber uses light to transmit voice and data communications over long distances when encapsulated in a jacket.

ITU.T, stands for International Telecommunication Union-Telecommunication Standardization Sector, is one of the three sectors of the ITU. The ITU is the United Nations specialized agency in the field of telecommunications. ITU-T is responsible for studying technical, operating and tariff questions and issuing Recommendations on them with a view to standardizing telecommunications on a worldwide basis.

The polarization mode dispersion (PMD) is a form of modal dispersion where two different polarizations of light in a waveguide, which normally travel at same speed, travel at different speeds due to random imperfections and asymmetries, causing random spreading of optical pulses.

In accordance with an embodiment of the present disclosure, the corrugated sheath design provides corrugation on a sheath of an optical fiber cable to reduce coefficient of friction while still complying with a gas leak proof requirement. The number of contact points between the optical fiber cable and a duct may be reduced that further reduces a coefficient of friction between the sheath and an inner surface of the duct.

FIG. 1 is a pictorial representation illustrating a corrugated sheath design for an optical fiber cable (100) in accordance with an embodiment of the present disclosure.

In accordance with another embodiment of the present disclosure, the optical fiber cable (100) is an air blown optical fiber cable that includes a plurality of ribbons (102), a plurality of ribbon bundles (104), a first layer (106), one or more ripcords (108), one or more water swellable yarns (110), one or more strength members (112) and a second layer (114).

In accordance with an embodiment of the present disclosure, the plurality of ribbons (102) further includes a plurality of fibers. The plurality of fibers are intermittently bonded thus forms one or more intermittently bonded ribbons.

In accordance with an alternate embodiment of the present disclosure, the plurality of fibers are continuously bonded.

In accordance with an alternate embodiment of the present disclosure, the plurality of fibers may be loose fibers in-housed in tubes or sleeves.

In an implementation of the present disclosure, each of the plurality of ribbons (102) may have 12 optical fibers.

In accordance with an alternate embodiment of the present disclosure, each of the plurality of ribbons (102) may have less than 12 optical fibers.

In accordance with an alternate embodiment of the present disclosure, each of the plurality of ribbons (102) may have more than 12 optical fibers.

In an implementation of the present disclosure, the plurality of fibers may have a diameter of 250 µm.

In accordance with an alternate embodiment of the present disclosure, the plurality of fibers may have other suitable diameter.

In accordance with an embodiment of the present disclosure, the plurality of optical fibers may be but not limited to single-mode optical fibers or multi-mode optical fibers.

In accordance with one embodiment of the present disclosure, the plurality of optical fibers may be of ITU.T G.657A2 category.

In accordance with an alternate embodiment of the present disclosure, the plurality of optical fibers may be of ITU.T G.657A1 or G.657B3 or G.652D or other category.

In accordance with one embodiment of the present disclosure, the plurality of optical fibers may be coloured fibers.

In accordance with one embodiment of the present disclosure, the plurality of optical fibers may have maximum individual fiber polarization mode dispersion (PMD)≤0.2 ps/√km.

In accordance with an alternate embodiment of the present disclosure, the plurality of optical fibers may have a PMD link design value (PMDQ)≤0.1 ps/√km.

In accordance with yet another alternate embodiment of the present disclosure, value of the polarization mode dispersion (PMD) and PMDQ may vary.

In accordance with one embodiment of the present disclosure, the plurality of ribbons (102) may have a pitch of 250 µm. Alternatively, the pitch may vary.

In accordance with an embodiment of the present disclosure, the plurality of ribbons (102) may use colour coded ribbon matrix, band stripe printing or the like for ribbon identification.

In accordance with another embodiment of the present disclosure, the plurality of ribbons (102) are bundled to form the plurality of ribbon bundles (104). The plurality of ribbons (102) may be bundled using binder yarns. Alternatively, the plurality of ribbons (102) may be bundled using any other suitable means. The binder yarns may be coloured binder yarns. The binder yarns may be of same or of different colour. Alternatively, the binder yarns may be made of any suitable material.

In an implementation, each of the plurality of ribbon bundles (104) may include 6 ribbons.

In accordance with an alternate embodiment of the present disclosure, each of the plurality of ribbon bundles (104) may include less than 6 ribbons.

In accordance with an alternate embodiment of the present disclosure, each of the plurality of ribbon bundles (104) may include more than 6 ribbons.

In an exemplary example, a total number of optical fibers may be 432 (i.e., 12*6*6F) or less than 432 or more than 432 in the optical fiber cable (100).

In accordance with an embodiment of the present disclosure, the first layer (106) surrounds the plurality of ribbon bundles (104). In particular, the first layer (106) is a tape layer. Moreover, the tape layer may be a water blocking tape that prevents ingression of water inside a core of the optical fiber cable (100).

In accordance with an embodiment of the present disclosure, the tape layer may be composed of polyester, polyacrylate swelling powder, along with a corrosion inhibitor.

Alternatively, the first layer (106) may be made of any suitable material to enclose the plurality of ribbon bundles (104) and to prevent water ingression inside the core of the optical fiber cable (100).

In accordance with an embodiment of the present disclosure, the first layer (106) is enclosed by the second layer (114). In particular, the second layer (114) is a sheath layer (or sheath) or an outer jacket. Moreover, the second layer (114) provides safety to the optical fiber cable (100) from external stresses and environmental conditions.

In accordance with an embodiment of the present disclosure, the second layer (114) is made of an ultra-violet (UV) proof black polyethylene material. Alternatively, the second layer (114) is made of thermoplastic material.

Alternatively, the second layer (114) is made of low smoke zero halogen material. The low smoke zero halogen is a material classification typically used for cable jacketing in the wire and cable industry that is composed of thermoplastic or thermoset compounds that emit limited smoke and no halogen when exposed to high sources of heat.

In accordance with an alternate embodiment of the present disclosure, the second layer (114) is made of polyethylene material.

In accordance with an alternate embodiment of the present disclosure, the second layer (114) is made of any suitable polymeric material.

In an exemplary example, the second layer (114) is made of High Density Poly Ethylene (HDPE).

In another exemplary example, the second layer (114) is made of Ultra-Violet (UV) proof High Density Poly Ethylene (HDPE). Alternatively, the second layer (114) is made of medium-density polyethylene (MDPE), low-density-polyethylene (LDPE), low smoke zero halogen (LSZH), polypropylene or any other suitable material. Further, the second layer (114) may have a thickness in a range of 1.6 mm to 3 mm depending on fiber count.

In accordance with an alternate embodiment of the present disclosure, the second layer (114) is a corrugated sheath that includes a plurality of ribs (116) and a plurality of grooves (118). In particular, the second layer has a surface with an alternate depressed region and raised regions that cover the periphery of the second layer (114). The raised region is the plurality of ribs (116) and the depressed region is the plurality of grooves (118).

In an exemplary example, the number of plurality of ribs (116) is equal to the number of plurality of grooves (118). The plurality of ribs (116) is longitudinal protrusions on an external or outer surface of the corrugated sheath and is parallel to an axis of the optical fiber cable (100). Further, the second layer (114) has a non-corrugated inner surface. The formation of the plurality of ribs (116) and the plurality of grooves (118) reduces number of contact points between the optical fiber cable (100) and the duct and thus reduces the coefficient of friction between the second layer (114) and the inner surface of the duct, which provides increased blowing capacity to the optical fiber cable. Each of the plurality of ribs (116) may have equal height and width.

In accordance with an alternate embodiment of the present disclosure, each of the plurality of ribs (116) may have unequal height and width. In an example, the plurality of ribs (116) may have the height up to 0.3 mm that helps maintain required mechanical strength of the cable.

Particularly, the distance between successive ribs of the plurality of ribs (116) may be in a range of 0.2-2.5 mm. The distance between successive ribs cannot be below 0.2 mm as manufacturing becomes difficult at very small size. Similarly, each of the plurality of grooves (118) may have equal depth and width.

In accordance with an alternate embodiment of the present disclosure, each of the plurality of grooves (118) may have unequal depth and width.

In accordance with an embodiment of the present disclosure, the plurality of ribs (116) may have a density (number of ribs/outer diameter of cable) ranging between 1.2 to 6.2, where reducing the density below 1.2 can lead to gas leakage and density higher than 6.2 can be difficult to manufacture as the plurality of ribs (116) become too small.

In accordance with an embodiment of the present disclosure, the distance between successive ribs of the plurality of ribs (116) maximum at 2.5 mm and with the density of plurality of ribs (116) 1.2 contributes to produce the sheath that is corrugated with an outer diameter of the optical fiber cable of 70 mm and also adhering to gas leak compliance.

In an implementation of the present disclosure, the number of the plurality of ribs (116) may range between 40-50 for the optical fiber cable (100) having an outer diameter of 12.5 mm. The plurality of ribs (116) and the plurality of grooves (118) may be of a rectangular shape with rounded edges, a pointy triangle shape, a curve-type shape, a rectangular shape, a triangular shape, a trapezoidal shape, an arc-shape or any other suitable shape.

In accordance with an embodiment of the present disclosure, the plurality of ribs (116) and the plurality of grooves (118) may be made thin or thick as per requirement.

In accordance with an embodiment of the present disclosure, the second layer (114) having the corrugated surface is optimised to meet requirements of blowing as well as gas leak proof sealing in a joint closure box.

In an implementation, a ratio of the number of the plurality of ribs (116) and the outer diameter (or diameter) of the optical fiber cable (100) may be below 6.2.

The plurality of ribs (116) and the plurality of grooves (118) may be $$\frac{N_g * W * H * 100}{\pi(OD^2 - ID^2) * 0.25}$$

fabricated in the second layer (114) with respect to a corrugation ratio.

The corrugation ratio corresponds to an amount of a void space created by the plurality of grooves (118) in a smooth sheath.

Figure 2:
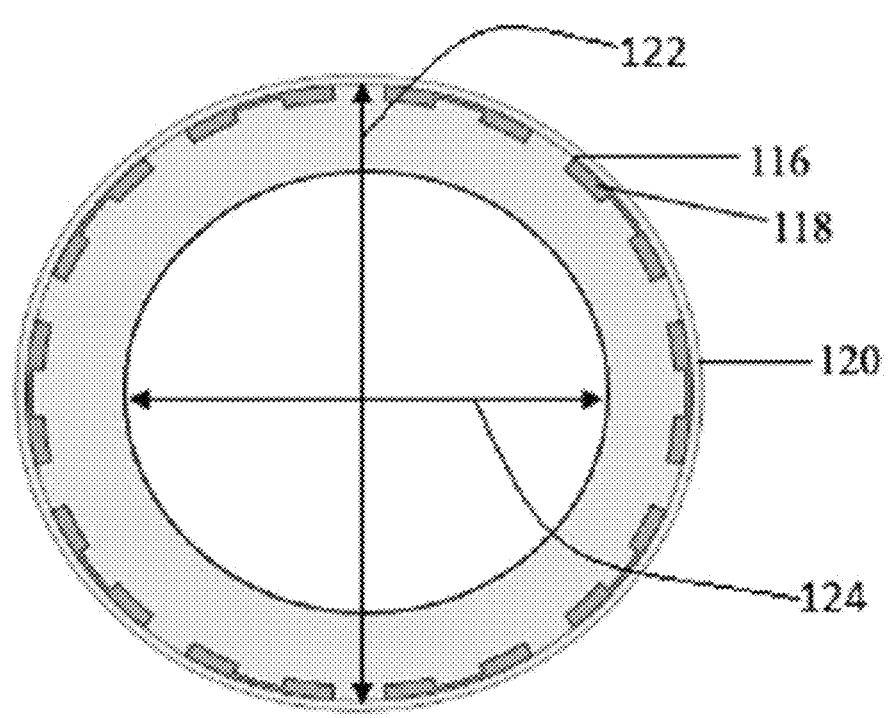
FIG. 2 is a pictorial representation illustrating the optical fiber cable having a corrugated sheath inside a seal in accordance with an embodiment of the present disclosure.

FIG. 2 is a pictorial representation illustrating the optical fiber cable (100) having a corrugated sheath inside a seal (120) in accordance with an embodiment of the present disclosure. In particular, the corrugation ratio defines the amount of material removed from the smooth sheath to produce corrugation as illustrated in FIG. 2. The corrugation ratio may go up to 11% and is defined along with a density range of ribs (1.2-6.2 ribs/OD). The corrugation ratio may be determined by: where $N_g$ is number of grooves, W is width of groove, H is depth of groove, OD represented as (122) (i.e., D1=OD is measured from top of a rib to top of diametrically opposite rib) is outer diameter of the sheath and ID (D2) represented as (124) is inner diameter of the sheath. The width of groove (W) may be determined by:

W=0.5(width of groove at base+width of groove at top).

That is, an area of the plurality of grooves (118) may be up to 11% of $\pi*(OD^2-ID^2)*0.25$. The area of the plurality of grooves (118) being up to 11% of $\pi*(OD^2-ID^2)*0.25$ makes the optical fiber cable (100) to have a lower coefficient of friction as compared to a conventional smooth or without corrugation optical fiber cable and to be compliant with gas blockage test i.e., no gas leakage between the second layer (114) (sheath) and a joint closure seal when air or any other suitable gas is filled in excess of 0.3±0.03 bar gauge pressure inside the joint closure box.

In accordance with an embodiment, the gas that is used for testing may be a tracer gas, a non-limiting example of which is 5% Hydrogen, 95% Nitrogen.

In accordance with an embodiment of the present disclosure, the joint closure box is used to store connections between two optical fiber cables and is kept underground in manholes.

Figure 3:
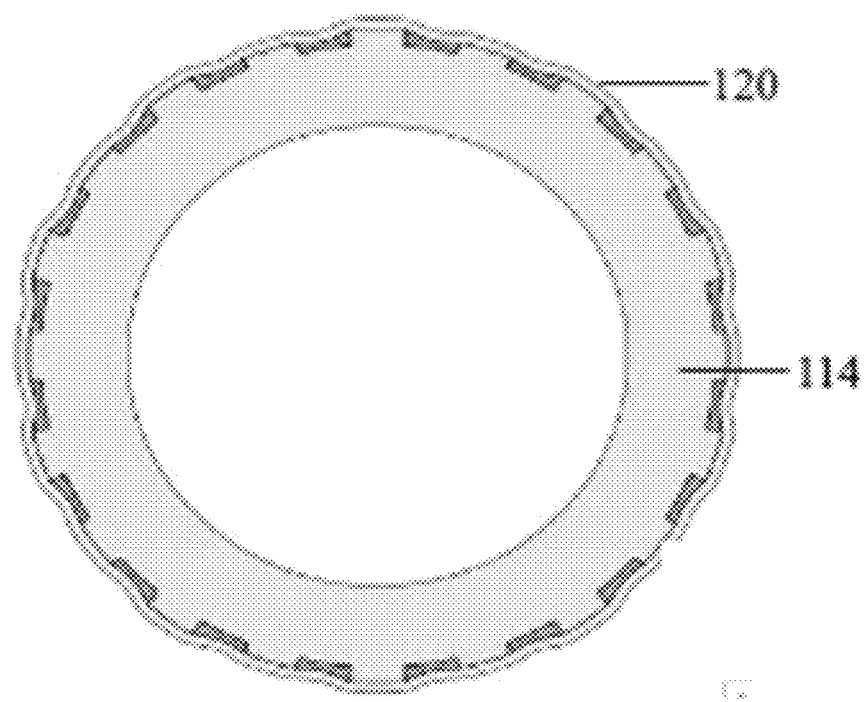
FIG. 3 is a pictorial representation illustrating a seal conforming to the corrugated sheath design in accordance with an embodiment of the present disclosure.

FIG. 3 is a pictorial representation illustrating a seal (120) conforming to the corrugated sheath design in accordance with an embodiment of the present disclosure.

Now referring to FIG. 2 and FIG. 3 the tight seal (120) prevents entry of dust particles, water etc. in the joint closure box, which may damage the optical fibers. To obtain this, the optical fiber cable is inserted in the joint closure box and then sealed with the gas inside.

The sheath i.e., the second layer (114) and the joint closure box maintains the tight sealing (120) such that the gas does not leak outside.

In an implementation of the present disclosure, an open end of the cable is placed into a pressure chamber at a temperature ranging from 15 to 25° C. with a sealing system on the outside.

In accordance with an alternate embodiment of the present disclosure, the temperature may vary.

In accordance with an embodiment of the present disclosure, the second layer (114) has one or more strength members (112) embedded into it. One or more strength members (112) may be made of fiber reinforced plastic (FRP) or aramid reinforced plastic (ARP).

In accordance with an embodiment, one or more strength members (112) may be made of any other suitable material.

In accordance with an embodiment, one or more strength members (112) may be of circular shape.

In accordance with an alternate embodiment of the present disclosure, one or more strength members (112) may be of any other suitable shape.

In an implementation of the present disclosure, one or more strength members (112) may be coated.

In accordance with an alternate embodiment of the present disclosure, one or more strength members (112) may not be coated.

One or more strength members (112) provides tensile strength and anti-buckling properties to the optical fiber cable (100).

Figure 4:
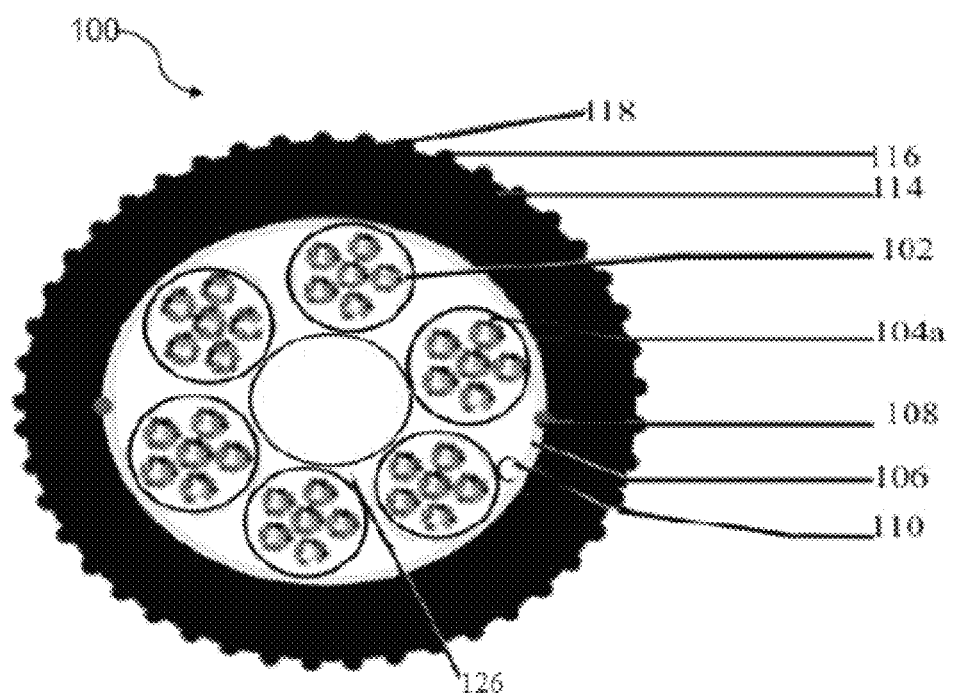
FIG. 4 is a pictorial representation illustrating a corrugated sheath design for an optical fiber cable having a central strength member in accordance with an embodiment of the present disclosure.

FIG. 4 is a pictorial representation illustrating a corrugated sheath design for an optical fiber cable having a central strength member in accordance with an embodiment of the present disclosure. In particular, the optical fiber cable (100) further includes a central strength member (CSM) (126) with an optical fiber retaining element (104 a). The optical fiber retaining element (104 a) may be but not limited to loose tube, buffer tube or the like that includes one or more loose optical fibers, optical fiber ribbons etc.

In accordance with an embodiment of the present disclosure, when the optical fiber cable (100) has optical fiber retaining element (104a) then the sheath without embedded strength members may be used.

In accordance with an embodiment of the present disclosure, the optical fiber cable (100) includes one or more ripcords (108) for easy stripping of the optical fiber cable (100). In particular, one or more ripcords (108) are twisted yarns.

In accordance with an embodiment of the present disclosure, one or more ripcords (108) may be made of nylon, aramid, polyester and combination thereof.

In accordance with an embodiment of the present disclosure, one or more ripcords (108) may be two in numbers.

In accordance with an alternate embodiment of the present disclosure, the number of one or more ripcords (108) may vary.

In accordance with an embodiment of the present disclosure, one or more ripcords (108) may be placed between the first layer (106) and the second layer (114).

In accordance with an alternate embodiment of the present disclosure, one or more ripcords (108) may be placed at suitable locations inside the optical fiber cable (100).

Further, the optical fiber cable (100) includes the water swellable yarn (110) acting as a water blocking element. The water swellable yarn (110) prevents water ingression in the optical fiber cable (100). The water swellable yarn (110) may be located in the core of the optical fiber cable (100).

In accordance with an embodiment of the present disclosure, the optical fiber cable (100) may be defined along a longitudinal axis (not shown) passing through a geometrical center (not shown) of the optical fiber cable (100). The longitudinal axis is an imaginary axis along lengthwise direction of the optical fiber cable (100).

In general, the geometrical center is a central point of the optical fiber cable (100). The optical fiber cable (100) may have maximum tensile strength of 1500N at 0.6% fiber strain. The optical fiber cable (100) may have a short term bend diameter as 12D and a long term bend diameter as 20D, where D is the diameter of the optical fiber cable (100). Further, the optical fiber cable (100) may have a crush resistance as 1000N/10 cm and an impact load as 10 Nm. Furthermore, the optical fiber cable (100) may have a torsion as ±180° at 100N.

In accordance with an embodiment of the present disclosure, the optical fiber cable (100) may have other suitable values of tensile strength, bend diameter, crush resistance, impact load and torsion.

The optical fiber cable (100) may have temperature performance ranging between −10° C. to +85° C. Further, the optical fiber cable (100) may have a diameter up to 13 mm with an ovality of 5% and a weight as 80±10% kg/km. Furthermore, the optical fiber cable (100) may have a length as 2 Km±5%.

In accordance with an embodiment of the present disclosure, the optical fiber cable (100) may have other suitable diameter, weight and length.

In accordance with an embodiment of the present disclosure, the optical fiber cable (100) is compliant with IEC Standard and BT CW 1854.

Additionally, the present disclosure proposes a method to fabricate a corrugated optical fiber cable (100) to ease installation via blowing while being in compliant with gas leak requirements, wherein the plurality of ribs (116) and the plurality of grooves (118) are fabricated in the second layer (114) with the corrugation ratio up to 11% that is determined by: where $N_g$ is number of grooves, W is width of groove, H is depth of groove, OD (i.e., OD (D1) represented as (122) is measured from top of a rib to top of diametrically opposite rib) is outer diameter of the sheath and ID (D2) represented as (124) is inner diameter of the sheath and wherein the width of groove (W) may be determined by: W=0.5(width of groove at base+width of groove at top).

The present disclosure of corrugated sheath for the optical fiber cable provides advantages such reduced friction while making the optical fiber cable suitable for efficient blowing and complying with gas leak proof requirements.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the disclosure have been described above and illustrated in some cases, it should be interpreted and understood as to have been presented only by way of illustration and example, but not by limitation. Thus, the breadth and scope of a preferred embodiment should not be limited by any of the above-described exemplary embodiments.

It will be apparent to those skilled in the art that other alternatives of the disclosure will be apparent to those skilled in the art from consideration of the specification and practice of the disclosure. While the foregoing written description of the disclosure enables one of ordinary skill to make and use what is considered presently to be the best mode thereof, those of ordinary skill will understand and appreciate the existence of variations, combinations, and equivalents of the specific aspect, method, and examples herein. The disclosure should therefore not be limited by the above described alternative, method, and examples, but by all aspects and methods within the scope of the disclosure. It is intended that the specification and examples be considered as exemplary, with the true scope of the disclosure being indicated by the claims.

It is to be understood that the terms so used are interchangeable under appropriate circumstances and embodiments of the disclosure are capable of operating according to the present disclosure in other sequences, or in orientations different from the one(s) described or illustrated above.

While the detailed description has shown, described, and pointed out novel features as applied to various alternatives, it can be understood that various omissions, substitutions, and changes in the form and details of the devices or algorithms illustrated can be made without departing from the scope of the disclosure. As can be recognized, certain alternatives described herein can be embodied within a form that does not provide all of the features and benefits set forth herein, as some features can be used or practiced separately from others.

What is claimed is:

1. A corrugated sheath for an optical fiber cable, comprising:
a plurality of ribs on an external surface of the corrugated sheath, wherein the plurality of ribs is defined by corrugation ratio up to 11%, wherein a number of ribs per unit outer diameter of the optical fiber cable is 1.2 to 6.2.

2. The corrugated sheath as claimed in claim 1, wherein the corrugation ratio is defined as $$\frac{N_g * W * H * 100}{\pi(OD^2 - ID^2) * 0.25}$$

wherein,
$N_g$=number of grooves
W=width of groove
H=depth of groove
OD=outer diameter of the corrugated sheath
ID=Inner diameter of the corrugated sheath.

3. The corrugated sheath as claimed in claim 1, wherein the corrugated sheath ensures no gas leak from a joint closure box filled with air or any other gas with a gauge pressure of 0.3±0.03 bar.

4. The corrugated sheath as claimed in claim 1, wherein a temperature inside a gas sealing system is in a range of 15° to 25° C.

5. The corrugated sheath as claimed in claim 1, wherein a tracer gas used for testing is 5% Hydrogen and 95% Nitrogen or any other tracer gas.

6. The corrugated sheath as claimed in claim 1, wherein the plurality of ribs has a height up to 0.3 mm.

7. The corrugated sheath as claimed in claim 1, wherein a distance between successive ribs of the plurality of ribs is 0.2 to 2.5 mm.

8. The corrugated sheath as claimed in claim 1, wherein the corrugated sheath has one or more strength members embedded into the corrugated sheath.

9. The corrugated sheath as claimed in claim 1 is used in the optical fiber cable, wherein the optical fiber cable has a central strength member.

10. The corrugated sheath as claimed in claim 1, wherein all ribs of the plurality of ribs are of same height and all grooves of a plurality of grooves are of same depth.

11. The corrugated sheath as claimed in claim 1, wherein an inner surface of the corrugated sheath is smooth or non-corrugated.

12. The corrugated sheath as claimed in claim 1, wherein the optical fiber cable further comprises a first layer, wherein the first layer is a tape layer.

13. The corrugated sheath as claimed in claim 12, wherein the tape layer is composed of a polyester, a polyacrylate swelling powder, and a corrosion inhibitor.

14. The corrugated sheath as claimed in claim 1, wherein the optical fiber cable comprises a plurality of ribbons, a plurality of ribbon bundles, a first layer, one or more ripcords, one or more water swellable yarns, one or more strength members and a second layer.

15. The corrugated sheath as claimed in claim 14, wherein the one or more ripcords is placed between the first layer and the second layer.

16. The corrugated sheath as claimed in claim 15, wherein the plurality of ribbons have a pitch of 250 µm.

17. The corrugated sheath as claimed in claim 14, wherein the one or more strength members are embedded in the second layer.

18. The corrugated sheath as claimed in claim 17, wherein the one or more strength members is made of a fiber reinforced plastic (FRP) or an aramid reinforced plastic (ARP).

19. The corrugated sheath as claimed in claim 14, wherein the water swellable yarn is located in a core of the optical fiber cable.

\* \* \* \* \*